(No Model.)

W. E. MULLINS.
BUTCHER'S IMPLEMENT.

No. 426,541.   Patented Apr. 29, 1890.

Witnesses
C. C. Burdine
F. P. Davis

Inventor
William E. Mullins
per R. G. Du Bois
Atty.

UNITED STATES PATENT OFFICE.

WILLIAM E. MULLINS, OF CHICAGO, ILLINOIS.

BUTCHER'S IMPLEMENT.

SPECIFICATION forming part of Letters Patent No. 426,541, dated April 29, 1890.

Application filed February 21, 1890. Serial No. 341,278. (No model.)

*To all whom it may concern:*

Be it known that I, WILLIAM E. MULLINS, a citizen of the United States, residing at Chicago, in the county of Cook and State of Illinois, have invented certain new and useful Improvements in Butchers' Implements; and I do hereby declare the following to be a full, clear, and exact description of the invention, such as will enable others skilled in the art to which it appertains to make and use the same.

My invention relates to pritch-irons for butchering purposes; and my object is to produce a device which can be used in skinning cattle without injury to the hides, and which at the same time will be exceedingly cheap, simple, and durable.

In using the ordinary pritch, which usually consists of a wooden rod with metal spurs or points at each end, it is driven into the carcass through the hide, and thus injures the latter and deteriorates the value of the same.

My invention contemplates overcoming this difficulty, as previously stated, and with this end in view consists in certain peculiarities of construction and combinations of parts, more fully described hereinafter, and pointed out in the claims.

Figure 1:
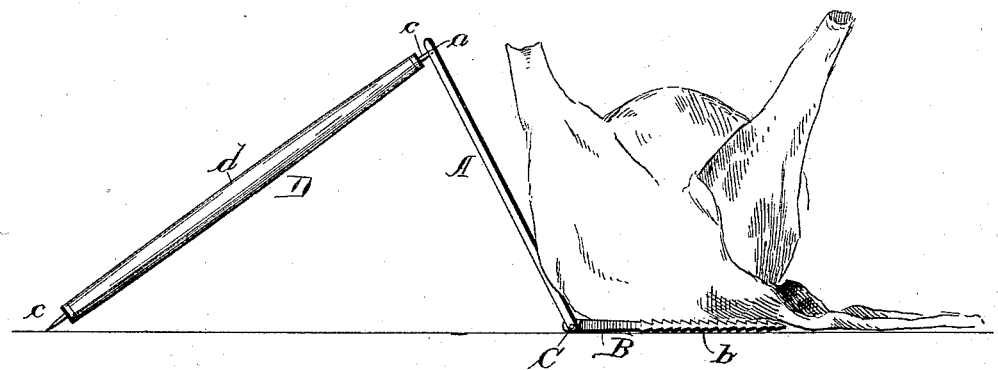
Figure 2:
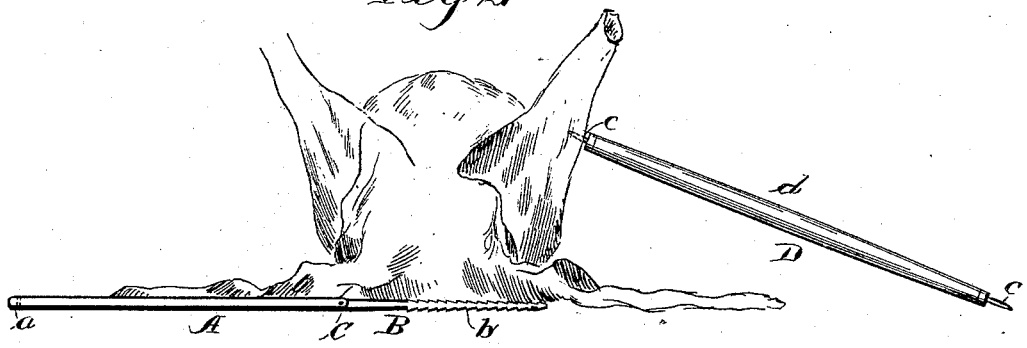
Figure 3:
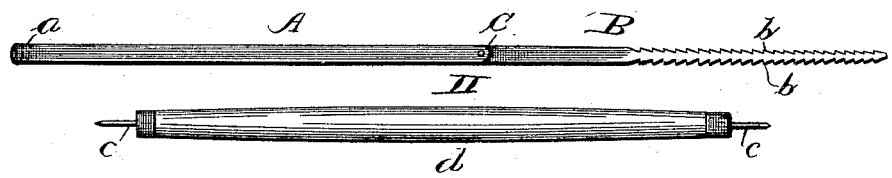

Referring to the accompanying drawings, Figure 1 is a view of my device, showing its position in its first application in connection with an auxiliary pritch; Fig. 2, a similar view showing its next position and also that of the auxiliary pritch, and Fig. 3 a detached view of my device alone.

The tool is made in two sections A and B, the section B being about two-thirds the length of the section A, and these two parts are hinged together by a swivel-joint C. The section A is preferably made of a square iron rod having a depression or notch *a* in its upper end, and the section B consists of a wedge-shaped iron provided with a series of serrations or teeth *b* on both sides, and these serrations extend about two-thirds the length of said section B and are cut on a slant, as shown in Figs. 1 and 2.

In connection with this device I employ an auxiliary tool D, which is the ordinary pritch, consisting of the wooden portion *d* and the metal points *c*.

Having thus described the preferred manner of constructing my device, I will now proceed to describe its operation.

The wedge-shaped section C is laid upon the floor and the carcass of the animal rests upon it and holds it in place. The teeth in said piece C will engage the floor and prevent slipping, and the animal will thus be held stationary during the skinning operation.

The section A is elevated to an oblique position to bear against the side of the carcass and further steady it, as seen in Fig. 1, and is held in this position by the auxiliary pritch D, one end of which is made to engage the notch *a* in the upper end of the section A, while the other end is driven into the floor. The animal will thus be supported in position while the hide is being removed from the opposite side. After this has been done the pritch D is removed and the section A allowed to drop and lie flat on the floor. The auxiliary iron is then transferred to the opposite side and driven into the flesh from which the hide has been removed and its lower end forced into the floor. The hide can now be removed from the other side of the animal, the wedge-shaped piece B still holding the carcass from slipping on the floor and the pritch D steadying the latter. It will thus be apparent that by use of my improved tool the entire hide can be removed without sustaining any injury whatever.

It is evident that my invention could be changed in many slight ways which might suggest themselves to a mechanical mind, and hence I do not limit myself to the precise construction shown, but consider myself entitled to all such variations as come within the scope and spirit of my invention.

Having thus described my invention, what I claim as new, and desire to secure by Letters Patent, is—

1. A butcher's implement consisting of a pair of sections hinged together, one of said sections resting beneath the animal's body and the other supported against the side of latter, substantially as described.

2. A butcher's implement consisting of a serrated section holding the carcass from lateral movement and a section connected therewith and supported at an angle thereto against the side of said carcass, substantially as described.

3. A butcher's implement consisting of a wedge-shaped section having serrations in its upper and lower surfaces and holding the carcass from lateral movement, and a second section hinged to said serrated section and provided with a pritch, whereby it is held in elevated position, substantially as described.

In testimony whereof I affix my signature in presence of two witnesses.

WILLIAM E. MULLINS.

Witnesses:
THOMAS FINN,
JOSEPH F. HATCH.